United States Patent [19]
Ohkubo et al.
[11] Patent Number: 5,041,845
[45] Date of Patent: Aug. 20, 1991

[54] HEAT TRANSFER RECORDING APPARATUS WITH A COMMON DRIVE SOURCE FOR SELECTIVE PLURAL FUNCTIONS

[75] Inventors: Akio Ohkubo, Tokyo; Toshiyuki Hayashi; Masahiro Funakoshi, both of Yokohama, all of Japan

[73] Assignee: Canon Kabushiki Kaisha, Tokyo, Japan

[21] Appl. No.: 551,059

[22] Filed: Jul. 11, 1990

Related U.S. Application Data

[63] Continuation of Ser. No. 254,876, Oct. 7, 1988, abandoned.

[51] Int. Cl.[5] .......... G01D 15/10; B41J 2/325; B41J 11/66; B41J 23/34

[52] U.S. Cl. .......... 346/24; 346/76 PH; 400/187; 400/120; 400/621

[58] Field of Search .......... 358/304; 346/76 PH, 346/76 R, 24; 400/185, 187, 621, 621.1, 621.2, 120

[56] References Cited

U.S. PATENT DOCUMENTS 4,617,577 10/1986 Takahashi .......... 346/76 PH
4,639,739 1/1987 Tsutsumi .......... 346/76 PH
4,733,250 3/1988 Nozaki et al. .

FOREIGN PATENT DOCUMENTS 5413983 6/1976 Japan .
53-67309 6/1978 Japan .
178887 11/1982 Japan .
59-150762 8/1984 Japan .
12464 1/1985 Japan .
60-24030 7/1985 Japan .
61-24865 6/1986 Japan .
140466 6/1986 Japan .

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

A heat transfer recording apparatus for transmitting the ink of a heat transfer medium to a recording medium to thereby record an image on the recording medium has conveying member for conveying the recording medium, winding member for winding the heat transfer medium after image recording, a cutter for cutting the recording medium after image recording, a drive source, first force transmitting member for transmitting the drive force of the drive source to the winding member and second force transmitting member for transmitting the drive force of the drive source to the cutter.

24 Claims, 6 Drawing Sheets

HEAT TRANSFER RECORDING APPARATUS WITH A COMMON DRIVE SOURCE FOR SELECTIVE PLURAL FUNCTIONS

This application is a continuation of application Ser. No. 254,876 filed Oct. 7, 1988 now abandoned.

BACKGROUND OF THE INVENTION

1. Field of the Invention

This invention relates to a heat transfer recording apparatus for transferring the ink of a heat transfer medium to a recording medium to thereby record an image on the recording medium.

As the heat transfer recording apparatus, mention may be made of a printer, a word processor or a facsimile apparatus.

2. Related Background Art

For example, as the output device of a word processor or the like, heat transfer recording in which use is made of an ink sheet comprising a base film and heat-transferable ink applied thereto, the inked surface of the ink sheet is superposed on a recording sheet, and heat is applied to the base film side of the ink sheet by a thermal head in conformity with an image signal, whereby the ink is melted or reduced in viscosity and transferred onto the recording sheet to thereby form a recorded image thereon is widely utilized because of its low noise, high quality of image and good preservability of images.

The recording apparatus for carrying out the above-described heat transfer recording, as is disclosed, for example, in Japanese Laid-Open Patent Application No. 59-150762, is designed such that the conveyance of the recording sheet and the conveyance of the ink sheet and further the driving of a cutter for cutting the recording sheet are accomplished by a single motor or by three motors corresponding to said conveyance and said driving.

However, to effect the conveyance of the recording sheet and the conveyance of the ink sheet at the same time by a single motor, the load applied to the motor is great, e.g. about twice as great as the load of a thermosensitive recording apparatus and therefore, the cost of the motor is increased. Particularly, to improve the recording speed, it is necessary to improve the conveyance speed of each sheet and therefore, it becomes necessary to further increase the output of the motor, and this is a factor of a further increased cost.

Also, where design is made such that the recording sheet, the ink sheet and the cutter are driven by three motors as previously described, there are the problems that the cost of the motors is likewise increased and that the volume of the recording apparatus is also increased.

SUMMARY OF THE INVENTION

It is an object of the present invention to provide a heat transfer recording apparatus which is capable of high-speed image recording.

It is another object of the present invention to provide a heat transfer recording apparatus which is more compact.

It is still another object of the present invention to provide a heat transfer recording apparatus which is lower in cost.

It is still another object of the present invention to provide a heat transfer recording apparatus designed such that the conveyance of a heat transfer medium and the driving of cutter means for cutting a recording medium are accomplished by the drive force of a common drive source.

DESCRIPTION OF THE PREFERRED EMBODIMENT

A full line type heat transfer recording apparatus to which an embodiment of the present invention is applied will hereinafter be described with reference to the drawings.

The embodiment which will hereinafter be described is a heat transfer recording apparatus for transferring the ink of a heat transfer medium having heat-transferable ink to a recording medium and recording images on the recording medium. The apparatus has conveying means for conveying the recording medium, winding means for winding the heat transfer medium after recording, cutter means for cutting the recording medium after recording, a drive source, first force transmitting means for transmitting the drive force of said drive source to said winding means, and second force transmitting means for transmitting the drive force of said drive source to said cutter means.

According to the present invention, in the heat transfer recording apparatus for transferring heat-transferable ink onto the recording medium and forming images thereon, the winding means for winding the heat transfer medium after recording and the cutter means for cutting the recording medium after recording can be driven by a common drive source through the first force transmitting means and the second force transmitting means.

An embodiment of the full line type heat transfer recording apparatus to which the present invention is applied will hereinafter be described with reference to the drawings.

Figure 1:
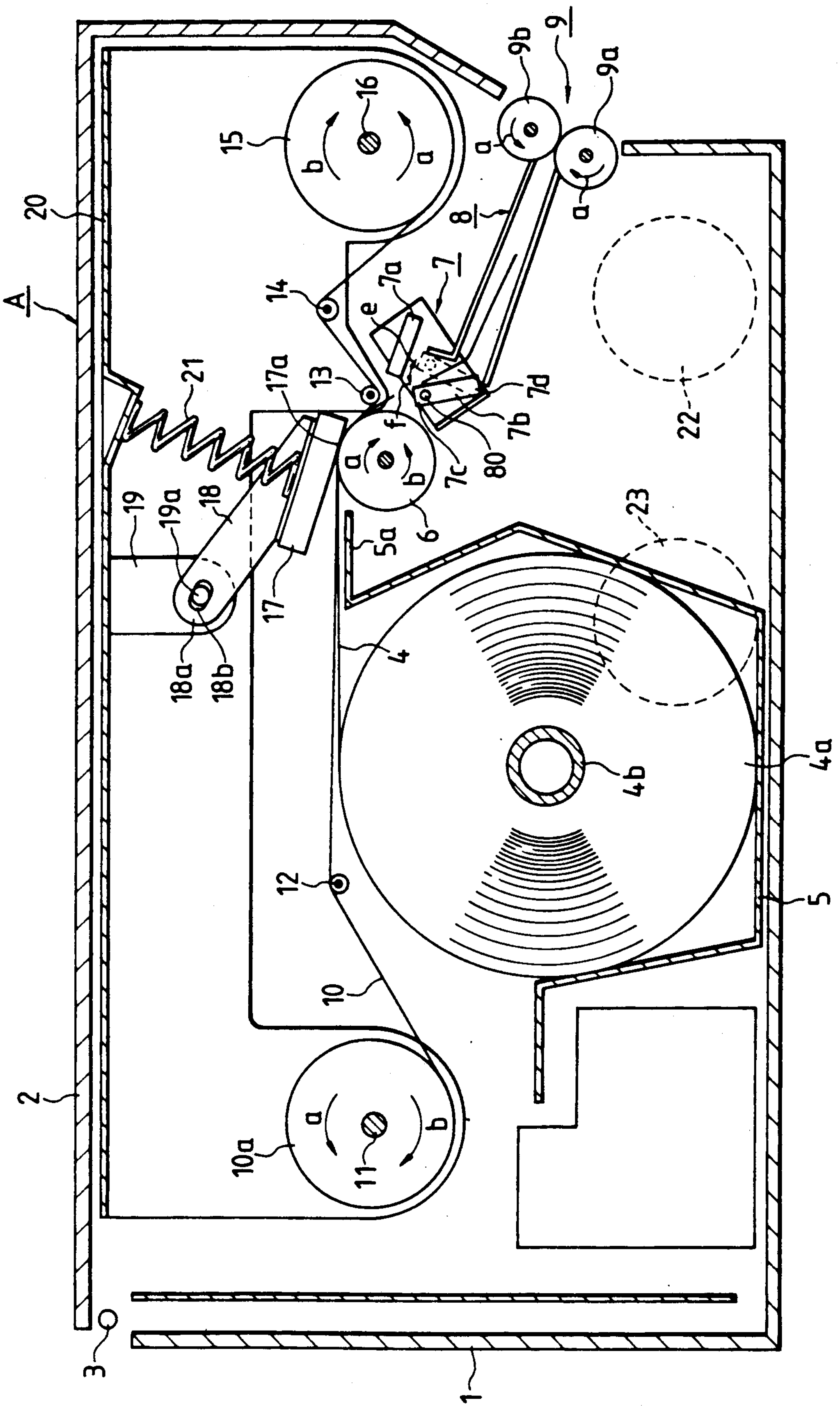
FIG. 1 is a cross-sectional view of a full line type heat transfer recording apparatus to which an embodiment of the present invention is applied.
Figure 2:
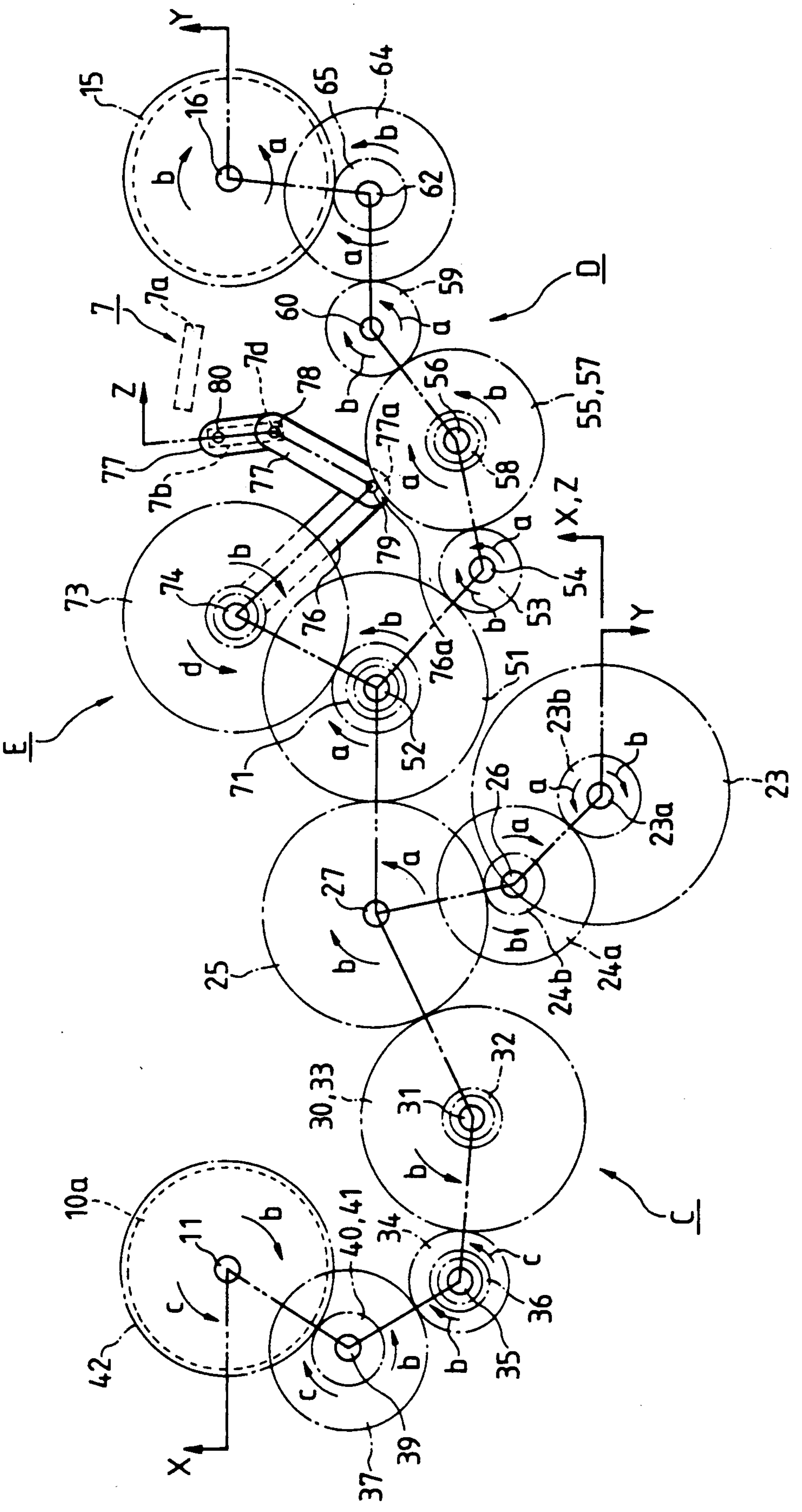
FIG. 2 is an illustration of a driving system using a motor.
Figure 3:
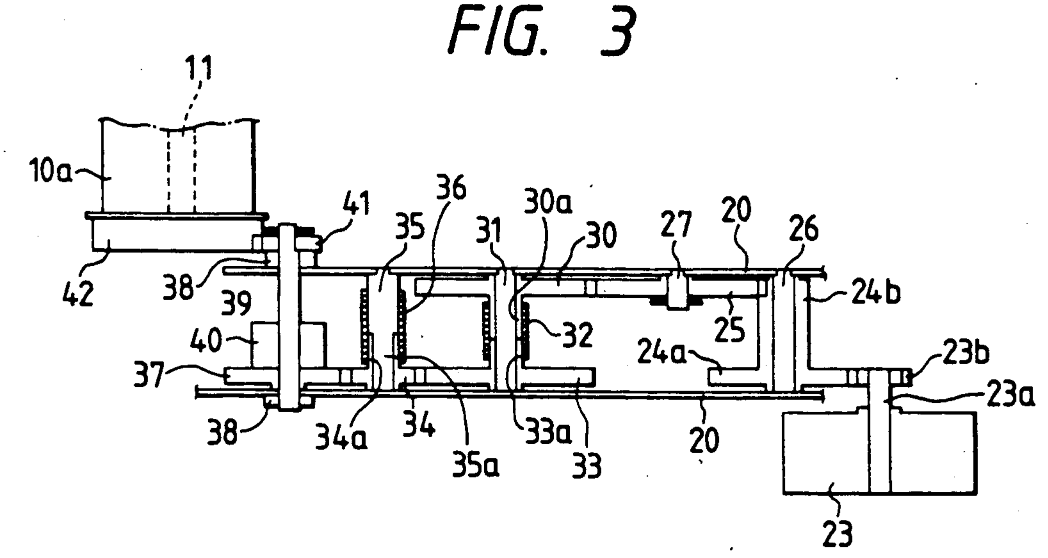
FIG. 3 is a cross-sectional view taken along line X—X of FIG. 2.
Figure 4:
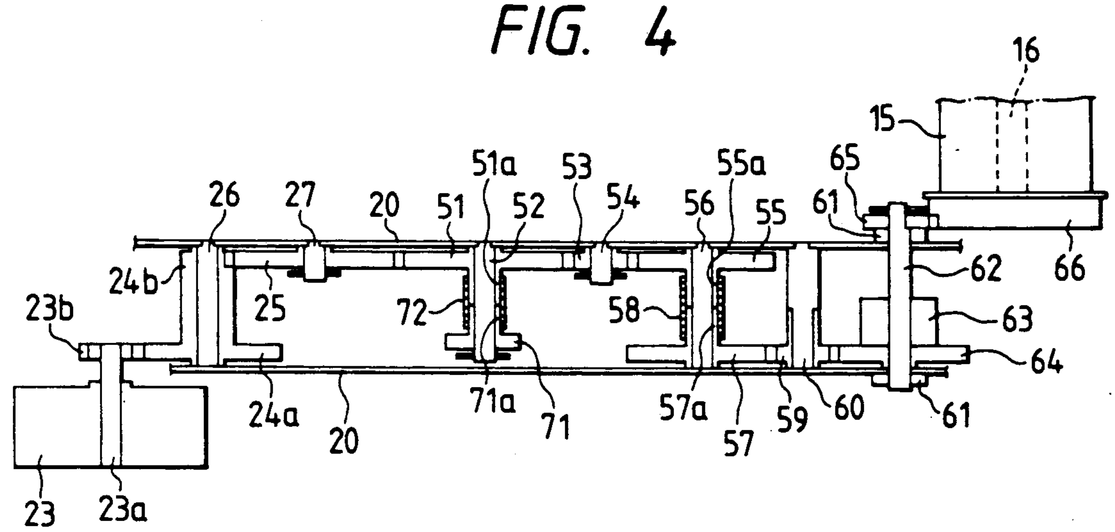
FIG. 4 is a cross-sectional view taken along line Y—Y of FIG. 2.
Figure 5:
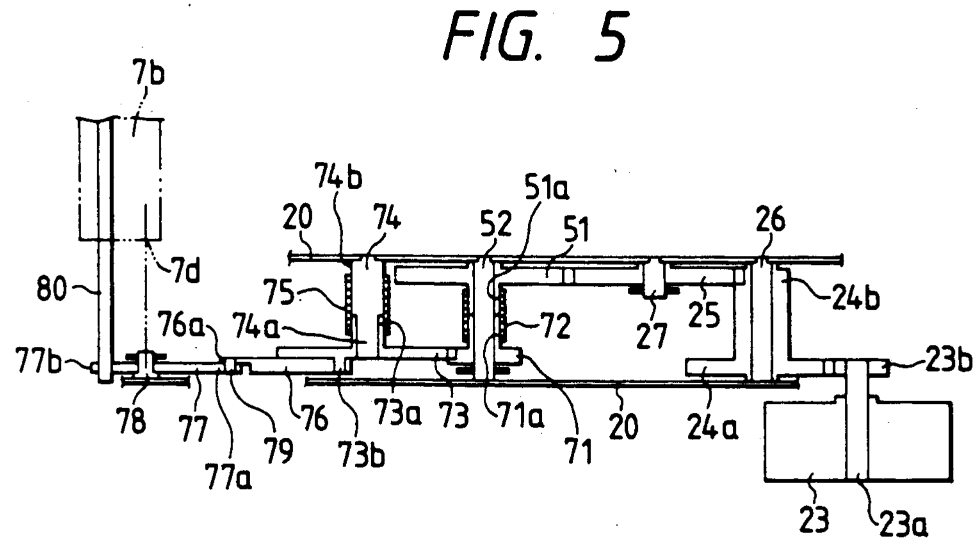
FIG. 5 is a cross-sectional view taken along line Z—Z of FIG. 2.
Figure 6:
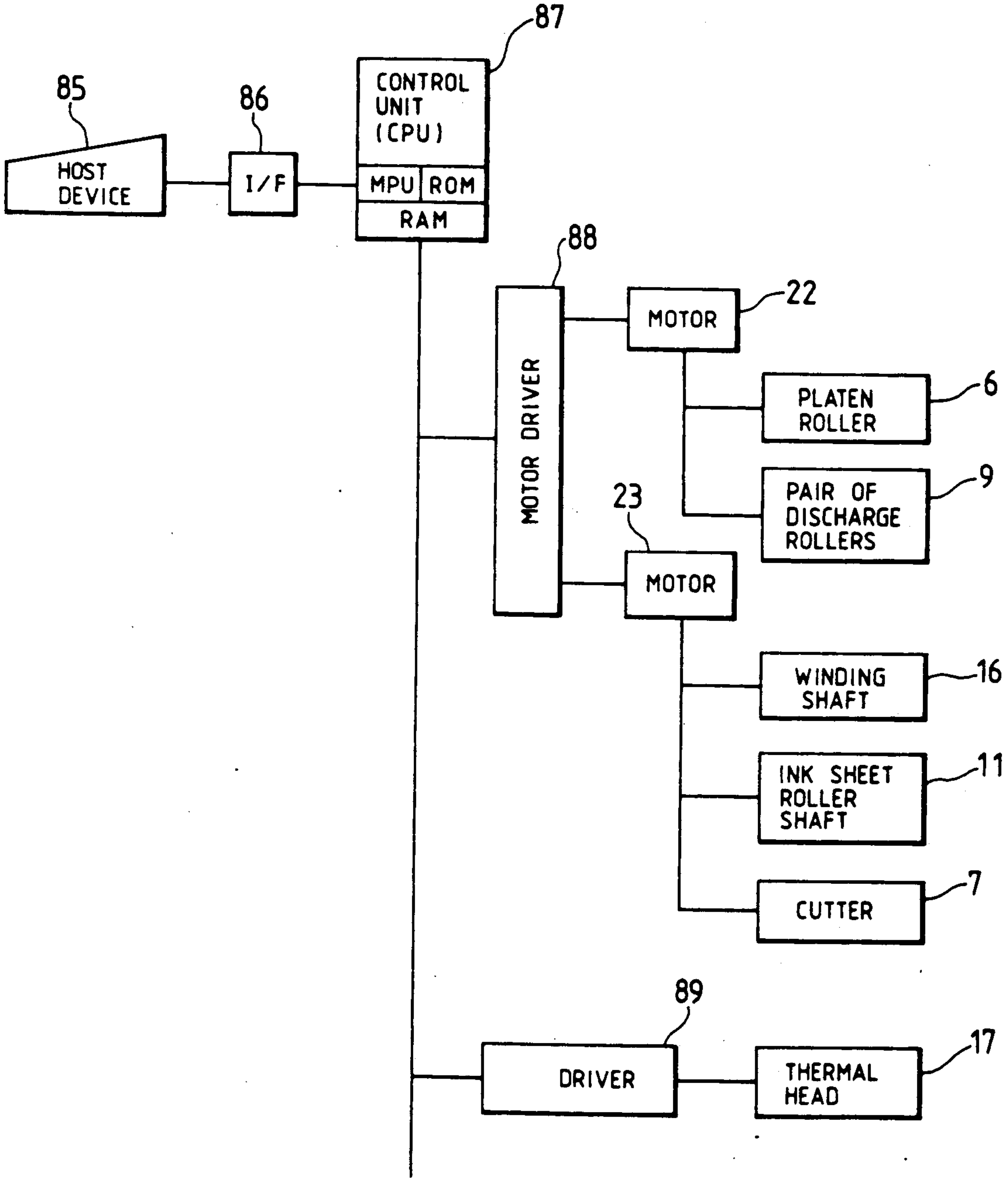
FIG. 6 is a block diagram of a control system.
Figure 7:
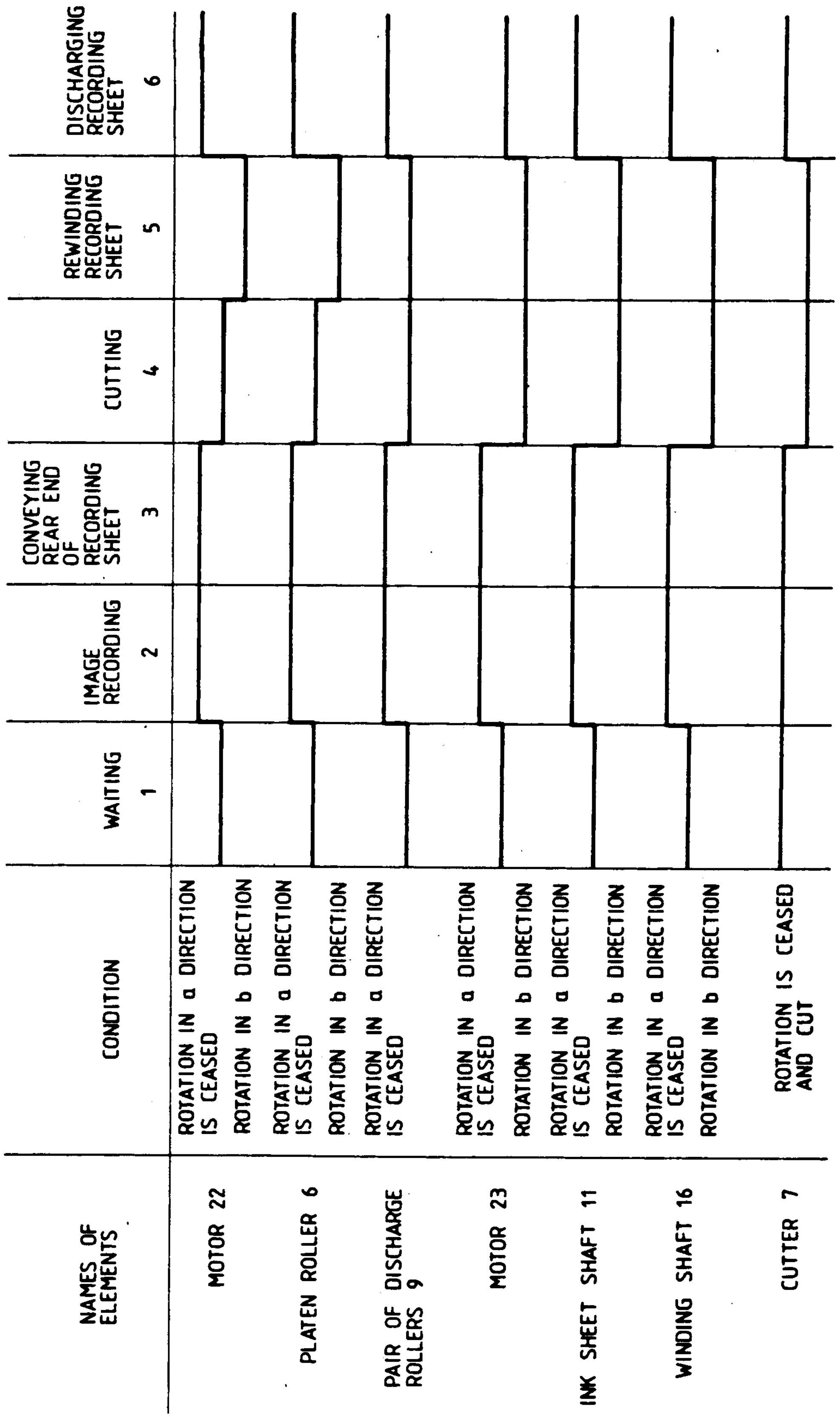
FIG. 7 is a timing chart of operating portions.
Figure 8:
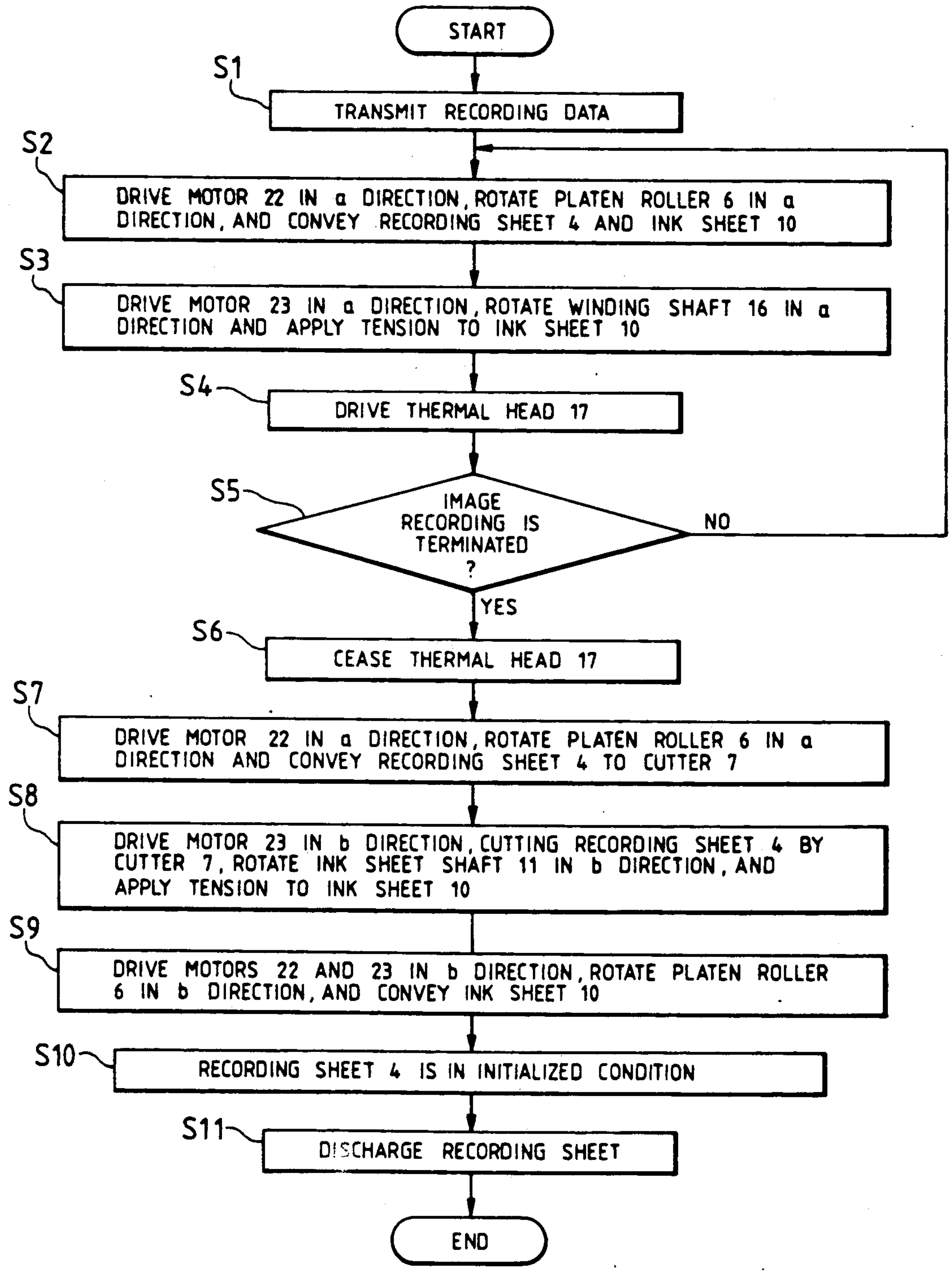
FIG. 8 is a flow chart.

FIG. 1 is a cross-sectional view of the heat transfer recording apparatus according to the present embodiment, and FIG. 2 is an illustration of a driving system. FIG. 3 is a cross-sectional view taken along line X—X of FIG. 2, FIG. 4 is a cross-sectional view taken along line Y—Y of FIG. 2, and FIG. 5 is a cross-sectional view taken along line Z—Z of FIG. 2. FIG. 6 is a block diagram of a control system, FIG. 7 is a timing chart, and FIG. 8 is a flow chart.

In FIG. 1, only a recording unit is shown and an input unit for recording information is not shown. The input unit may be a host computer, or the reading unit or the receiving unit of a facsimile apparatus, or the key input unit of a word processor, or the like.

In FIG. 1, the letter A designates the apparatus body. The reference numeral 1 denotes a first housing containing therein various components which will be described later, and the reference numeral 2 designates a second housing pivotably supported on a shaft 3 provided in the first housing 1 and functioning as a lid member.

The reference numeral 4 denotes a recording medium which may be plain paper or a plastic sheet (hereinafter referred to as the "recording sheet"). A recording sheet roll 4*a* comprising the recording sheet 4 wound in the form of a roll on a core 4*b* is removably contained in a holder 5. The leading end of the recording sheet 4 drawn out from the recording sheet roll 4*a* may pass the upper portion of a guide portion 5*a* formed in one end portion of the holder 5, may pass the upper portion of a platen roller 6 and may pass between a fixed cutting edge 7*a* and a movable cutting edge 7*b* which constitute a cutter 7. The recording sheet may then be guided by a pair of upper and lower guides 8 and may be discharged out of the apparatus body A while being nipped by a pair of discharge rollers 9 constituted by a pair of rollers 9*a* and 9*b*.

The cutter 7 is constituted by the fixed cutting edge 7*a* and the movable cutting edge 7*b* rotated by a driving system E which will be described later, and is provided on the discharge path of the recording sheet 4. The movable cutting edge 7*b* is designed to be rotated in the direction of arrow e, f of FIG. 1 about the center of rotation 7*d* and mesh with the fixed cutting edge 7*a* to thereby cut the recording sheet 4.

The reference numeral 10 designates a heat transfer medium comprising a base film which may be a resin film such as sheet-like polyethylene terephthalate, and heat-transferable ink applied onto said base film, said ink being melted or reduced in viscosity by heating (hereinafter referred to as the "ink sheet").

An ink sheet roll 10*a* comprises the ink sheet 10 wound in the form of a roll so that the inked surface thereof is on the outer side thereof. The ink sheet roll 10*a* is removably mounted on an ink sheet shaft 11 formed above the holder 5 and driven by a driving system C which will be described later. The ink sheet roll 10*a* is designed such that the ink sheet is drawn out with the progress of image recording and can be again wound by a predetermined amount after image recording is terminated and the recording sheet 4 is cut by the cutter 7.

The leading end of the ink sheet 10 drawn out from the ink sheet roll 10*a* may be guided by a guide roller 12 and the ink sheet may be superposed on the recording sheet 4 at the platen roller 6 with the inked surface thereof bearing against the recording sheet. The ink sheet 10 may then be separated from the recording sheet 4 by a separating shaft 13 and may be wound by a winding roller 15 via a guide roller 14.

The winding roller 15 is removably mounted on a winding shaft 16 driven by a driving system D which will be described later, and it winds the ink sheet 10 in synchronism with the progress of image recording. The winding roller 15 is designed so as to be capable of rewinding the ink sheet 10 by a predetermined amount after image recording is terminated and the recording sheet 4 is cut by the cutter 7.

During the winding or rewinding of the ink sheet 10 and further, during the conveyance thereof accompanying the progress of image recording, it is necessary that predetermined tension be always applied to the ink sheet 10. The reason is that since the ink sheet 10 is formed of a very thin film, the ink sheet 10 will be wrinkled and the wrinkles will adversely affect the formation of images if the ink sheet is conveyed without tension being applied thereto.

The reference numeral 17 designates a full line type thermal head. The thermal head 17 has arranged on the surface thereof a plurality of heat generation elements 17*a* which individually generate heat in response to an image signal, and is provided over the full width of the image recording area along and in opposed relationship with the platen roller 6. Also, the thermal head 17 is adhesively or otherwise secured to a lever 18 which is pivotally supported on the shaft 19*a* of a bracket 19 through a slot 18*b* formed in the end portion 18*a* of the lever 8. Further, a compression spring 21 is provided between the back of the thermal head 17 and a frame 20, and the thermal head is biased toward the platen roller 6 by the compression spring 21.

That is, the thermal head 17 has the recording sheet 4 and the ink sheet 10 interposed between the thermal head 17 and the platen roller 6, and is biased by the compression spring 21 to urge the ink sheet 10 against the recording sheet 4. In this state, the heat generation elements 17*a* are caused to generate heat in the form of an image pattern to thereby melt the heat-transferable ink of the ink sheet 10 or reduce the viscosity thereof, thus transferring the ink onto the recording sheet 6.

The platen roller 6 and the pair of discharge rollers 9 are driven by a motor 22 through a transmission member such as a gear train, an endless belt or an endless chain, not shown. The platen roller 6 is rotated in the directions of arrows a and b in FIG. 1 (in FIGS. 1 and 2, the rotation in the direction of arrow a is the rotation when recording is carried out, and the rotation in the direction arrow b is the rotation during the rewinding of the recording sheet 4 and the ink sheet 10), and the pair of discharge rollers 9 are rotated only in the direction of arrow a through a clutch, not shown.

The platen roller 6 is designed such that between it and the thermal head 17, the recording sheet 4 and the ink sheet 10 are superposed one upon the other and the recording sheet 4 and the ink sheet 10 are conveyed at a time by the biasing force of the compression spring 21 provided on the back of the thermal head 17.

The ink sheet shaft 11, the winding shaft 16 and the cutter 7 are designed to be driven by a motor 23.

The driving systems C, D and E for the ink sheet shaft 11, the winding shaft 16 and the cutter 7 using the motor 23 will now be described with reference to FIGS. 2 to 5.

FIG. 2 is a transmission diagram of the driving system using the motor 23 which is constructed on a frame 20, not shown in FIG. 2. In FIG. 2, the letter C designates the driving system for the ink sheet shaft 11, the letter D denotes the driving system for the winding shaft 16, and the letter E designates the driving system for the cutter 7.

The driving system C for the ink sheet shaft 11 will first be described with reference to FIGS. 2 and 3.

An output gear 23*b* is secured to the shaft 23*a* of the motor 23 secured to a predetermined location on the frame 20. A gear 24*a* which is a first-stage reduction gear is in meshing engagement with the output gear 23*b*. A gear 24*b* is formed integrally with the gear 24*a*, and a gear 25 which is a second-stage reduction gear is in meshing engagement with the gear 24*b*. The revolution of the motor 23 is decelerated by the meshing engagement between the output gear 23*b* and the gears 24*a*, 24*b* and the gear 25 and is transmitted to various portions which will be described later. The gears 24*a*, 24*b* and 25 are rotatably supported on shafts 26 and 27 secured to the frame 20 as by clamping.

The reference numeral 30 designates a transmission gear which is in meshing engagement with the gear 25 and is rotatably supported on a shaft 31 secured to the frame 20, and a spring clutch 32 is secured to the boss 30*a* of the transmission gear 30. A gear 33 is rotatably supported on the shaft 31. The boss 33*a* of the gear 33 is formed with the same dimensions as the boss 30*a* of the transmission gear 30, and the spring clutch 32 is provided astride the boss 30*a* and the boss 33*a* and is adapted to transmit only the rotation of the transmission gear 30 in a particular direction (the direction of arrow b in FIG. 2) to the gear 33.

The reference numeral 34 denotes a clutch gear which meshes with the gear 33 and is rotatably supported on the shaft portion 35*a* of a stepped shaft 35 secured to the frame 20, and the boss 34*a* of the gear 34 is formed with the same dimensions as the outer diameter of the stepped shaft 35. A spring clutch 36 provided astride the boss 34*a* is secured to the outer diameter of the stepped shaft 35, and this spring clutch 36 functions as a brake for blocking the rotation of the gear 34 in a particular direction (the direction of arrow c in FIG. 2.).

A gear 37 is in meshing engagement with the gear 34. The gear 37 is formed integrally with a torque limiter 40 secured to a shaft 39 rotatably supported by a bearing 38. A gear 41 is secured to the shaft 39, and this gear 41 is in meshing engagement with a gear 42 secured to the ink sheet shaft 11. The torque limiter 40 transmits the rotational force transmitted from the motor 23 to the shaft 39 with a predetermined torque irrespective of the rotational speed thereof, and this transmission torque is transmitted to the ink sheet shaft 11 while being increased or decreased in conformity with the gear ratio between the gear 41 and the gear 42, thus accomplishing the rewinding of the ink sheet 10.

The driving of the ink sheet shaft 11 constructed as described above is such that when the motor 23 revolves in the direction of arrow a in FIG. 2, this revolution is not transmitted from the gear 30 to the gear 33 by the action of the spring clutch 32 and accordingly, the ink sheet shaft 11 is not driven. Also, when the motor 23 revolves in the direction of arrow b, this revolution is transmitted to the gear 33 by the action of the spring clutch 32 and is further transmitted to the gear 42 through the clutch gear 34 and the torque limiter 40 to thereby rotate the ink sheet shaft 11. Tension corresponding to the set value of the torque limiter 40 is applied to the ink sheet 10.

That is, when with the progress of recording, the ink sheet 10 is conveyed by the rotation of the platen roller 6 in the direction of arrow a, the ink sheet 10 is rewound from the ink sheet roll 10*a*. At this time, the rotational force in the direction of arrow c is applied to the ink sheet shaft 11 by the platen roller 6 through the ink sheet 10. This rotation in the direction of arrow c is transmitted to the torque limiter 40 through the gears 42 and 41, and is further transmitted to the clutch gear 34 by the gear 37. The rotation of the clutch gear 34 in the direction of arrow c is blocked by the action of the spring clutch 36 secured to the stepped shaft 35 as a brake, and accordingly, a torque corresponding to the set value of the torque limiter 40 is applied to the ink sheet shaft 11. Tension likewise corresponding to the set value of the torque limiter 40 is applied to the ink sheet 10 between the ink sheet shaft 11 and the platen roller 6. Wrinkling of the ink sheet 10 is prevented by this tension.

When image recording is terminated and the recording sheet 4 is cut by the cutter 7 and thereafter the recording sheet 4 and the ink sheet 10 are returned to the initial position by the platen roller 6 while remaining superposed one upon the other, the aforementioned rotation in the direction of arrow b is transmitted to the ink sheet shaft 11 and re-winding can be accomplished while tension is applied to the ink sheet 10 by this rotation.

Here, the set torque value of the torque limiter 40 is set so as to be smaller than the conveying force with which the ink sheet 10 is conveyed by the platen roller 6 when image recording is carried out. Also, the rotational speed of the ink sheet shaft 11 is set so as to be higher than the conveyance speed at which the recording sheet 4 and the ink sheet 10 are returned to their initial state after image recording is terminated and the recording sheet 4 is cut by the cutter 7.

The driving system C for the ink sheet 11 is constructed as described above and therefore, when image recording is carried out, the ink sheet roll 10*a* is rewound and supplied by the conveying force of the platen roller 6 and at this time, tension corresponding to the set value of the torque limiter 40 is applied to the ink sheet 10, whereby wrinkling of the ink sheet can be prevented. Also, when image recording is terminated and the recording sheet 4 and the ink sheet 10 are returned to their initial state, re-winding can be accomplished with tension applied to the ink sheet 10 by the revolution of the motor 23 through the torque limiter 40.

The driving system D for the winding shaft 16 will now be described with reference to FIGS. 2 and 4.

A gear 51 is in meshing engagement with the gear 25 which is the second-stage reduction gear. This gear 51 is rotatably supported on a shaft 52 secured to the frame 20, and a gear 71 for branching off to the driving system E for the cutter 7 which will be described later is engaged with the gear 51 through a spring clutch 72.

The reference numeral 53 designates an intermediate gear which meshes with the gear 51 and is rotatably supported on a shaft 54 secured to the frame 20. The reference numeral 55 denotes a gear which meshes with the gear 53 and is rotatably supported on a shaft 56 secured to the frame 20. A gear 57, like the gear 55, is rotatably supported on the shaft 56, and a spring clutch 58 is secured to the boss 55*a* of the gear 55 astride the boss 57*a* of the gear 57. A spring clutch 58 is designed to transmit the rotation of the gear 55 in a particular direction (the direction of arrow a in FIG. 2) to the gear 57.

A gear 59 is in meshing engagement with the gear 57. The gear 59 is rotatably supported on a shaft 60 secured to the frame 20. A gear 64 formed integrally with a torque limiter 63 secured to a shaft 62 rotatably supported by a bearing 61 is in meshing engagement with the gear 59. A gear 65 is secured to the shaft 62, and a gear 66 secured to the winding shaft 16 is in meshing engagement with the gear 65.

In the above-described construction, when the motor 23 revolves in the direction of arrow a, this revolution is transmitted from the gear 55 to the gear 57 through the spring clutch 58, and the rotation of the gear 57 is transmitted to the winding shaft 16 through the torque limiter 63. At this time, a predetermined torque is transmitted from the torque limiter 63 to the shaft 62 irrespective of the rotational speed, and this torque is transmitted to the winding shaft 16 while being increased or decreased in conformity with the gear ratio between the gear 65 and the gear 66. By this transmitted torque, tension is applied to the ink sheet 10 between the platen roller 6 and the winding shaft 16, and with the progress of image recording, the ink sheet 10 is wound onto the winding shaft 16.

When the motor 23 revolves in the direction of arrow b, the rotation of the gear 55 is not transmitted to the gear 57 by the action of the spring clutch 58 and accordingly, the winding shaft 16 is not driven.

The set torque value of the torque limiter 63 is set so as to be smaller than the restraining force of the ink sheet 10 created between the platen roller 6 and the thermal head 17 when image recording is not being carried out. Also, the winding speed of the winding shaft 16 for the ink sheet 10 is designed so as to be higher than the conveyance speed at which the platen roller 6 conveys the recording sheet 4 and the ink sheet 10 as image recording is carried out. By this speed difference, tension is applied to the ink sheet 10 between the platen roller 6 and the winding shaft 16.

The driving system D for the winding shaft 16 is constructed as described above and therefore, when image recording is started, the motor 23 begins to revolve in the direction of arrow a and the ink sheet 10 can be wound onto the winding shaft 16 while tension corresponding to the set value of the torque limiter 63 is applied to the ink sheet 10. Also, when image recording is terminated and the ink sheet 10 and the recording sheet 4 are returned to the initial position by the platen roller 6, no tension is applied to the ink sheet 10, but since this amount of return is small, no adverse effect is imparted to the ink sheet during the formation of a recorded image.

The driving system E for the cutter 7 will now be described with reference to FIGS. 2 and 5.

A gear 71 is rotatably supported on the shaft 52. A spring clutch 72 provided astride the boss 71*a* of the gear 71 is secured to the boss 51*a* of the gear 51, and this spring clutch 72 is designed such that the rotation of the gear 51 in a particular direction (the direction of arrow b in FIG. 2) is transmitted to the gear 71.

The reference numeral 73 designates a gear which meshes with the gear 71 and is rotatably supported on the shaft portion 74*a* of a stepped shaft 74 secured to the frame 20. The boss 73*a* of the gear 73 is formed with the same diameter as the outer diameter of the stepped shaft 74, and a spring clutch 75 is secured to the outer diameter of the stepped shaft 74 astride the boss 73*a* of the gear 73. The spring clutch 75 has the function as a brake for the rotation of the gear 73 in a particular direction (the direction of arrow d in FIG. 2).

A shaft portion 73*b* is integrally formed on the surface of the gear 73, and a link 76 is rotatably supported on the shaft portion 73*b*.

The reference numeral 77 denotes a link formed in an inverted dog-legged shape. The link 77 is rotatably supported on a shaft 78 secured to the frame 20 substantially at the central portion thereof. The link 77 has one end portion 77*a* thereof rotatably connected to the end portion 76*a* of the link 76 through a pin 76. The other end 77*b* of the link 77 is pivotably supported on a shaft 80 secured to the movable side end portion 7*c* of the movable cutting edge 7*b* constituting the cutter 7.

The shaft 78 is provided on the extension of the center of rotation 7*d* of the movable cutting edge 7*b*.

In the above-described construction, when the motor 23 revolves in the direction of arrow a, the rotation of the gear 51 is not transmitted to the gear 71 by the action of the spring clutch 72 and accordingly, the cutter 7 is not operated. Also, when the motor 23 revolves in the direction of arrow b, the rotation of the gear 51 is transmitted to the gear 71 by the action of the spring clutch 72 to thereby rotate the gear 73. With the rotation of the gear 73, the link 76 rotates, and the rotation of the link 76 is transmitted to the link 77. The link 77 rotates in the direction of arrow e, f about the shaft 78, i.e., the center of rotation of the movable cutting edge 7*b* of the cutter 7, and this rotation is converted into movement of the movable cutting edge 7*b* through a shaft 80, whereby cutting of the recording sheet 4 is accomplished.

The driving system E for the cutter 7 is constructed as described above and therefore, with the revolution of the motor 23 in the direction of arrow b, the movable cutting edge 7*b* constituting the cutter 7 is driven, whereby the recording sheet 4 can be cut.

A block diagram of a control system for controlling the recording apparatus constructed as described above is shown in FIG. 6. In FIG. 6, the reference numeral 85 designates a host device such as a word processor for inputting image information or recording information such as recording start information. The reference numeral 87 denotes a control unit (CPU) which controls the entire heat transfer recording apparatus and which is provided with a ROM storing therein the control program and data of a microprocessor MPU, a RAM as a work area, etc. The recording information from the host device 85 is input to the control unit (CPU) 87 through an interface 86. As image recording is carried out, a control signal for driving the motor 22 and the motor 23 is transmitted from the control unit (CPU) 87 to the motors 22 and 23 through a motor driver 88. At the same time, a control signal conforming to the image signal is supplied from the control unit (CPU) 87 to the thermal head 17 through a driver 89 to selectively cause the heat generation elements 17*a* of the thermal head 17 to generate heat to thereby form a recorded image on the recording sheet 4.

FIG. 7 is a timing chart for driving the recording apparatus of the above-described construction, and shows one cycle of recording as being divided into six stages and shows the operations of various operating portions in the respective stages.

FIG. 8 is a flow chart in a case where recording is carried out by the use of the recording apparatus of the present embodiment.

The case where recording is carried out by the use of the recording apparatus of the present embodiment will hereinafter be described with reference to FIGS. 7 and 8.

First, during the "waiting" which is the first stage, rotation of the motor 22 and of the motor 23 is ceased.

At step S1, recording data such as image information and recording start information are transferred from the host device 85 to the control unit (CPU) 87, and advance is made to step S2.

At steps S2–S4, the motor 22 and the motor 23 start to revolve in the direction of arrow a at a time. By this revolution of the motor 22 in the direction of arrow a, the platen roller 6 and the pair of discharge rollers 9 are rotated in the direction of arrow a to convey the recording sheet 4 and the ink sheet 10. Also, by the revolution of the motor 23 in the direction of arrow a, the winding shaft 16 is rotated in the direction of arrow a to wind the ink sheet 10 onto the winding shaft 16 while applying tension to the ink sheet 10 between the platen roller and the winding shaft 16. At this time, tension conforming to the set value of the torque limiter 40 is applied to the ink sheet 10 between the platen roller 6 and the ink sheet shaft 11. Further, the thermal head 17 is driven in conformity with an image signal to melt the heat-transferable ink applied to the ink sheet 10 in the form of an image pattern or reduce the viscosity of the heat-transferable ink and transfer the ink onto the recording sheet 4.

The then operations of various operating portions correspond to the "recording" which is the second stage in FIG. 7.

At step S5, whether image recording has been terminated is judged and if the answer is "No", return is made to step S2, and if image recording is terminated, advance is made to step S6.

At step S6, the driving of the thermal head 17 is ceased.

At step S7, the motor 22 and the motor 23 are driven to convey the recording sheet 4 to the cutter 7. This operation corresponds to the "conveying the rear end of the recording sheet" which is the third stage in FIG. 7.

At step S8, the motor 23 is revolved in the direction of arrow b and the movable cutting edge *7b* constituting the cutter 7 is operated by the driving system E for the cutter 7 to thereby cut the recording sheet 4. At this time, the driving system C for the ink sheet shaft 11 is also driven by the revolution of the motor 23 in the direction of arrow b, and by this driving, tension is applied to the ink sheet 10 between the platen roller 6 and the ink sheet shaft 11, but since the platen roller 6 is stopped, the ink sheet 10 is not re-wound due to the set torque value of the torque limiter 40. This operation corresponds to the "cutting" which is the fourth stage in FIG. 7.

At step S9, the motor 22 and the motor 23 are revolved in the direction of arrow b to convey the recording sheet 4 and the ink sheet 10 in the direction back to the initial position. At this time, tension is applied to the ink sheet 10 between the platen roller 6 and the ink sheet shaft 11, and the ink sheet 10 is re-wound smoothly without being wrinkled. This operation corresponds to the "rewinding the recording sheet" which is the fifth stage in FIG. 7.

At step S10, the recording sheet 4 assumes the initial condition, and advance is made to step S11. At step S11, the recording sheet 4 having a recorded image formed thereon is discharged out of the apparatus body A by the pair of discharge rollers 9, thus completing all processes. This corresponds to the "discharging the recording sheet" which is the sixth stage in FIG. 7.

In the present embodiment, the transmission systems of the driving system C for the ink sheet shaft 11, the driving system D for the winding shaft 16 and the driving system E for the cutter 7 may utilize transmission systems such as endless belts or chains.

In the present embodiment, for example, a one-way clutch of the needle type or an electromagnetic clutch may be utilized instead of the spring clutch.

Also in the present embodiment, it is possible to provide the holder 5 for containing the recording sheet 4, the platen roller 6, the cutter 7, the guide 8 and the discharge roller *9a* in the first housing and provide the ink sheet shaft 11, the thermal head 17, the winding shaft 16 and the discharge roller *9b* in the second housing. The ink of the heat transfer medium is not limited to the heat-meltable ink, but may also be, for example, heat-sublimative ink or the like.

As described above, according to the present invention, the winding means for winding the heat transfer medium after recording and the cutter means for cutting the recording medium after recording are designed to be driven by a common drive source through the first force transmitting means and the second force transmitting means and therefore, the number of drive sources can be reduced. Also, an increase in the recording speed can be realized by increasing the outputs of the individual drive sources, and the overall cost can be reduced more than in a case where all operations are performed by a single drive source or a drive source is provided correspondingly to each operation.

We claim:

1. A heat transfer recording apparatus for recording an image on a recording medium, said apparatus comprising:
   - conveying means for conveying the recording medium;
   - recording means for recording an image on said recording medium by transferring ink contained on a heat transfer medium onto said recording medium;
   - winding means for winding the heat transfer medium;
   - cutter means having a fixed edge and a moveable edge rotatable with respect to said fixed edge and for cutting the recording medium by engagement of both said edges;
   - a drive source;
   - first force transmitting means for transmitting a drive force of said drive source to said winding means;
   - second force transmitting means for transmitting a drive force of said drive source to said cutter means; and
   - means for selectively transmitting the drive force of said drive source to said first and second transmitting means.

2. A heat transfer recording apparatus for recording an image on a recording medium, said apparatus comprising:
   - conveying means for conveying the recording medium;
   - recording means for recording an image on said recording medium by transferring ink contained on a heat transfer medium onto said recording medium;
   - winding means for winding the heat transfer medium;
   - rewinding means for rewinding the heat transfer medium wound by said winding means;
   - cutter means for cutting the recording medium;
   - a drive source;
   - first force transmitting means for transmitting a drive force of said drive source to said winding means;
   - second force transmitting means for transmitting a drive force of said drive source to said rewinding means;
   - third force transmitting means for transmitting a drive force of said drive source to said cutter means; and
   - means for selectively transmitting the drive force of said drive source to said first, second and third transmitting means.

3. A heat transfer recording apparatus according to claim 1, wherein the winding and rewinding of said heat transfer medium are effected with predetermined tension applied to said heat transfer medium.

4. A heat transfer recording apparatus according to claim 2, wherein the winding and rewinding of said heat transfer medium are effected with predetermined tension applied to said heat transfer medium.

5. A heat transfer recording apparatus according to claim 1, wherein said first force transmitting means has a spring clutch.

6. A heat transfer recording apparatus for transferring the ink of a heat transfer medium to a recording medium to thereby record an image on the recording medium, having:

conveying means for conveying the recording medium;

winding means for winding the heat transfer medium after image recording;

rewinding means for rewinding the heat transfer medium wound by said winding means;

cutter means for cutting the recording medium after image recording;

a drive source having a drive force;

first force transmitting means for transmitting the drive force of said drive source to said winding means;

second force transmitting means for transmitting the drive force of said drive source to said rewinding means, wherein said second force transmitting means has a spring clutch; and third force transmitting means for transmitting the drive force of said drive source to said cutter means; and, selecting means for selectively transmitting the drive force to said first, second or third force transmitting means.

7. A heat transfer recording apparatus according to claim 1, wherein said first force transmitting means has a spring clutch and a torque limiter.

8. A heat transfer recording apparatus for transferring the ink of a heat transfer medium to a recording medium to thereby record an image on the recording medium, having:

conveying means for conveying the recording medium;

winding means for winding the heat transfer medium after image recording;

rewinding means for rewinding the heat transfer medium wound by said winding means;

cutter means for cutting the recording medium after image recording;

a drive source having a drive force;

first force transmitting means for transmitting the drive force of said drive source to said winding means;

second force transmitting means for transmitting the drive force of said drive source to said rewinding means, wherein said second force transmitting means has a spring clutch and a torque limiter;

third force transmitting means for transmitting the drive force of said drive source to said cutter means; and selecting means for selectively transmitting the drive force to said first, second or third force transmitting means.

9. A heat transfer recording apparatus according to claim 1, wherein the recording medium cut by said cutter means is returned to its initial position while being superposed o said heat transfer medium.

10. A heat transfer recording apparatus according to claim 2, wherein the recording medium cut by said cutter means is returned to its initial position while being superposed on said heat transfer medium.

11. A heat transfer recording apparatus according to claim 2, wherein said first force transmitting means has a spring clutch and a torque limiter.

12. A heat transfer recording apparatus according to claim 1, wherein the winding speed of said heat transfer medium is higher than the conveyance speed of said heat transfer medium and said recording medium conveyed during image recording.

13. A heat transfer recording apparatus according to claim 2, wherein the winding speed of said heat transfer medium is higher than the conveyance speed of said heat transfer medium and said recording medium conveyed during image recording.

14. A heat transfer recording apparatus according to claim 1, wherein said conveying means has a platen roller and conveys said recording medium and said heat transfer medium which are pinched between said platen roller and a thermal head by rotation of said platen roller.

15. A heat transfer recording apparatus according to claim 1, wherein said apparatus further comprises a thermal head having a plurality of heat generating elements effecting said heat transfer medium so as to record on said recording medium.

16. A heat transfer recording apparatus according to claim 1, wherein said first force transmitting means has a torque limiter for transmitting a rotation force from a motor at a constant torque regardless of rotational speed thereof.

17. A heat transfer recording apparatus according to claim 1, wherein said cutter means has a fixed blade and a moveable blade and said recording medium is cut by engagement of said fixed blade and said moveable blade.

18. A heat transfer recording apparatus according to claim 2, wherein said drive source is a motor, and said winding means is driven by forward rotation of said motor and said rewinding means and said cutter means are driven by reverse rotation of said motor.

19. A heat transfer recording apparatus according to claim 2, wherein said conveying means has a platen roller and conveys said recording medium and said heat transfer medium which are pinched between said platen roller and a thermal head by rotation of said platen roller.

20. A heat transfer recording apparatus according to claim 2, wherein said apparatus further comprises a thermal head having a plurality of heat generating elements effecting said heat transfer medium so as to record on said recording medium.

21. A heat transfer apparatus according to claim 2, wherein said first force transmitting means has a torque limiter for transmitting a rotation force from a motor at a constant torque regardless of rotational speed thereof.

22. A heat transfer recording apparatus according to claim 2, wherein said cutter means has a fixed blade and a movable blade movable with respect to said fixed blade and said recording medium is cut by engagement of said fixed and said movable blade.

23. A heat transfer recording apparatus according to claim 1, wherein said selectively transmitting means has a control unit.

24. A heat transfer recording apparatus according to claim 2, wherein said selectively transmitting means has a control unit.

* * * * *

UNITED STATES PATENT AND TRADEMARK OFFICE
CERTIFICATE OF CORRECTION

PATENT NO. : 5,041,845 Page 1 of 2

DATED : August 20, 1991

INVENTOR(S) : AKIO OHKUBO ET AL.

It is certified that error appears in the above-identified patent and that said Letters Patent is hereby corrected as shown below:

On the title page:

AT [30] FOREIGN APPLICATION PRIORITY DATA

Insert, --[30] Foreign Application Priority Data
Oct. 13, 1987 [JP] Japan .......... 62-256235--.

AT [56] REFERENCES CITED

Foreign Patent Documents, "5413983 6/1976 Japan."
should read --54-13983 6/1976 Japan--.

COLUMN 9

Line 13, "The then" should read --The--.

COLUMN 11

Line 66, "o" should read --on--.

UNITED STATES PATENT AND TRADEMARK OFFICE
CERTIFICATE OF CORRECTION

PATENT NO. : 5,041,845

DATED : August 20, 1991

INVENTOR(S) : AKIO OHKUBO ET AL.

It is certified that error appears in the above-identified patent and that said Letters Patent is hereby corrected as shown below:

COLUMN 12

Line 61, "blade." should read --blades.---.

Signed and Sealed this

Fourth Day of May, 1993

Attest:

Michael K. Kirk

MICHAEL K. KIRK

Attesting Officer

*Acting Commissioner of Patents and Trademarks*